US011830347B2

(12) United States Patent
Larsen et al.

(10) Patent No.: US 11,830,347 B2
(45) Date of Patent: Nov. 28, 2023

(54) VEHICLE CONTROL FOR USER SAFETY AND EXPERIENCE

(71) Applicant: SONY GROUP CORPORATION, Tokyo (JP)

(72) Inventors: Tonni Larsen, San Diego, CA (US); Ted Yamazaki, San Diego, CA (US); Leigh Anderson, Novi, MI (US); Tatsushi Nashida, Kanagawa (JP); Naomasa Takahashi, Chiba (JP)

(73) Assignee: SONY GROUP CORPORATION, Tokyo (JP)

( * ) Notice: Subject to any disclaimer, the term of this patent is extended or adjusted under 35 U.S.C. 154(b) by 256 days.

(21) Appl. No.: 17/245,908

(22) Filed: Apr. 30, 2021

(65) Prior Publication Data

US 2022/0114879 A1 Apr. 14, 2022

Related U.S. Application Data

(60) Provisional application No. 63/089,416, filed on Oct. 8, 2020.

(51) Int. Cl.
  *G08B 27/00* (2006.01)
  *G08G 1/16* (2006.01)
  *B60Q 1/26* (2006.01)

(52) U.S. Cl.
  CPC ............ *G08B 27/006* (2013.01); *B60Q 1/26* (2013.01); *G08G 1/166* (2013.01)

(58) Field of Classification Search
  CPC .......... G08B 27/006; G08B 5/36; B60Q 1/26; B60Q 1/544; B60Q 1/5037; B60Q 1/535;
  (Continued)

(56) References Cited

U.S. PATENT DOCUMENTS 8,515,152 B2 * 8/2013 Siri ........................ B60S 5/00
  382/141
9,466,161 B2 10/2016 Ricci
  (Continued)

FOREIGN PATENT DOCUMENTS

CN 104787046 A 7/2015
CN 106696701 A 5/2017
  (Continued)

OTHER PUBLICATIONS

International Search Report and Written Opinion of PCT Application No. PCT/IB2021/059464, dated Jan. 13, 2022, 11 pages of ISRWO.

Primary Examiner — Omeed Alizada
(74) Attorney, Agent, or Firm — CHIP LAW GROUP

(57) ABSTRACT

A system and method of vehicle control for user safety and experience is provided. The system receives sensed information associated with a first vehicle, detects a state of the first vehicle, and determines activities of a person or a second vehicle in proximity of the first vehicle. Such activities are determined based on the sensed information. The system triggers actions based on whether or not the determined activities are unsafe for the first vehicle or for users of the first vehicle in the detected state. The system controls devices associated with the first vehicle based on the triggered actions. The devices include a light-based projector device that is controlled to project a visual alert, included in the triggered actions, directly onto a physical surface. The physical surface is a window portion of the first vehicle or a physical structure which is external to and separate from the first vehicle.

16 Claims, 12 Drawing Sheets

(58) Field of Classification Search
CPC ... B60Q 1/22; B60Q 1/38; B60Q 1/50; B60Q 1/543; B60Q 3/80; B60Q 9/00; B60Q 2400/40; B60Q 1/48; B60Q 1/509; B60Q 1/52; B60Q 2400/50; G08G 1/166; G08G 1/005; G08G 1/0112; B60R 25/31
See application file for complete search history.

(56) References Cited

U.S. PATENT DOCUMENTS

| | | | |
|---|---|---|---|
| 10,134,280 | B1 | 11/2018 | You |
| 10,184,802 | B2 | 1/2019 | Schreiber et al. |
| 2014/0049384 | A1 | 2/2014 | Mueller |
| 2015/0203023 | A1* | 7/2015 | Marti ................... B60W 30/10 340/425.5 |
| 2016/0129883 | A1* | 5/2016 | Penilla ................. B60R 25/305 348/148 |
| 2017/0138752 | A1 | 5/2017 | Mermelstein |
| 2017/0140651 | A1 | 5/2017 | Lee et al. |
| 2018/0004020 | A1 | 1/2018 | Kunii et al. |
| 2020/0216026 | A1* | 7/2020 | Price ............... G08B 13/19647 |

FOREIGN PATENT DOCUMENTS

| | | |
|---|---|---|
| DE | 102012016255 A1 | 2/2014 |
| EP | 2896937 A1 | 7/2015 |
| EP | 3170698 A1 | 5/2017 |
| JP | 6566642 B2 | 8/2019 |
| KR | 10-2017-0058188 A | 5/2017 |
| WO | 2018/128946 A1 | 7/2018 |

\* cited by examiner

VEHICLE CONTROL FOR USER SAFETY AND EXPERIENCE

REFERENCE

This application claims priority to U.S. Provisional Patent Application Ser. No. 63/089,416 filed on Oct. 8, 2020, the entire content of which is hereby incorporated herein by reference.

FIELD

Various embodiments of the disclosure relate to vehicle and user safety. More specifically, various embodiments of the disclosure relate to a system and method of vehicle control for user safety and experience.

BACKGROUND

Advancements in automobile technology have led to the development of various devices and techniques that may utilize information from vehicle sensors to ensure user and vehicle safety. Most of such devices and techniques may be limited to personalization of seat position adjustments, mirror position adjustments, key-based immobilization, or other adjustments associated with the vehicle. While such devices and techniques may help to enhance the user experience inside the vehicle, they may not necessarily help to ensure safety of the user outside of the car or safety of other people around the vehicle.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method of vehicle control for user safety and experience is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
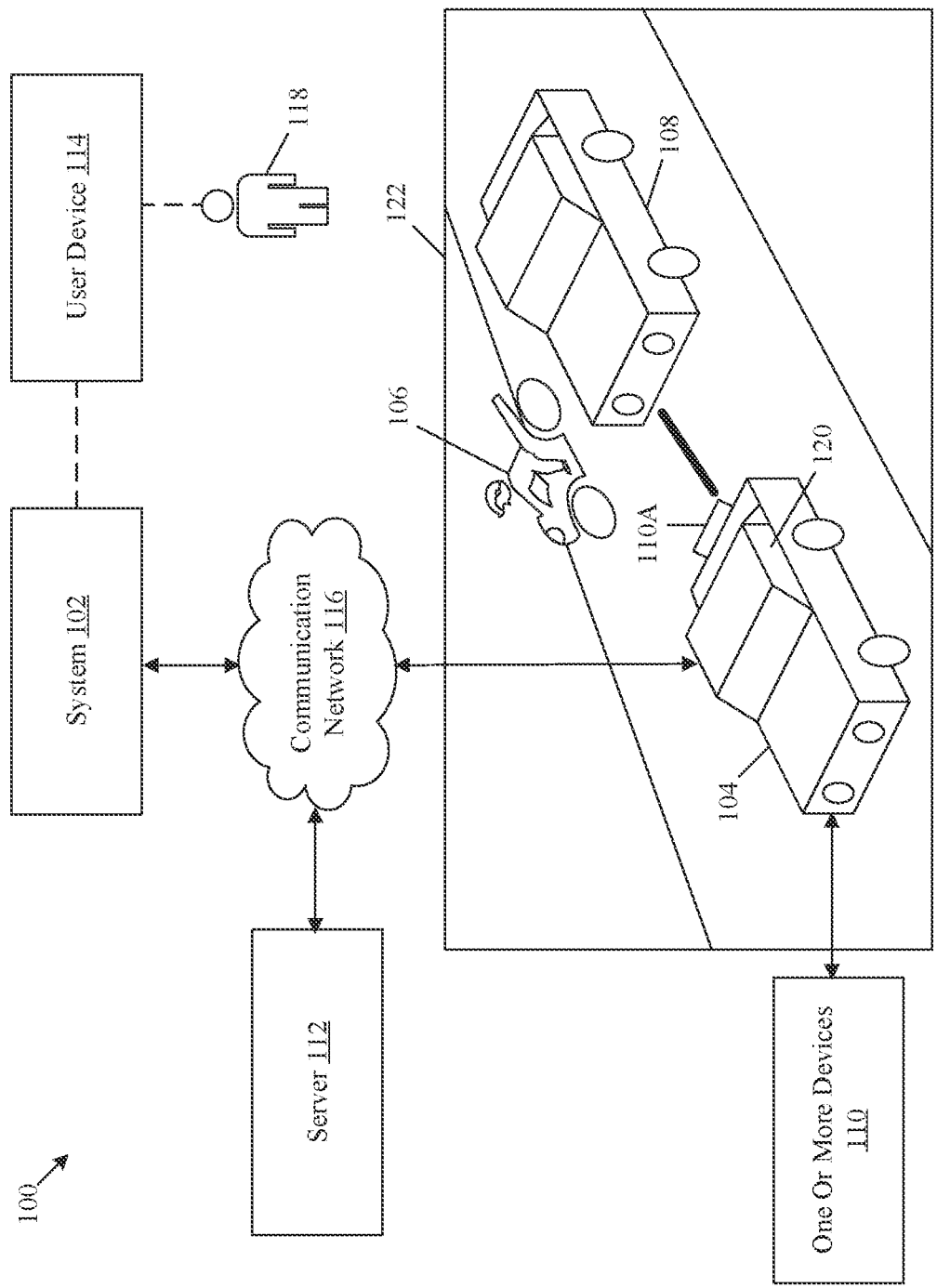
FIG. 1 is a block diagram that illustrates an exemplary environment for vehicle control for user safety and experience, in accordance with an embodiment of the disclosure.

The following described implementations may be found in a disclosed system and method of vehicle control for user safety and experience. Exemplary aspects of the disclosure provide a system which may provide a method of vehicle control for user safety and experience. The system may be implemented on, for example, a smartphone, an edge computing device, a vehicle (or a control system of a vehicle), an Internet of Things (IOT) device, a passenger drone and the like.

At any time-instant, the system may be configured to receive sensed information associated with a first vehicle. The sensed information may be acquired from sensors of the first vehicle or other sensor devices in vicinity of the first vehicle. The sensed information may include, for example, raw sensor data, results inferred based on analysis of the raw sensor data, post-processed sensor data, and the like. Based on the sensed information, the system may be configured to detect a state of the first vehicle as one of a parked state (such as a stationary state) or an unparked state (such as a moving state). The system may be further configured to determine one or more activities of a person or a second vehicle in proximity of the first vehicle, based on the sensed information.

The system may be configured to trigger one or more actions (such as to project a visual alert onto a physical surface or to transmit a notification to a user device) based on whether or not the determined one or more activities are unsafe for the first vehicle in the detected state or for one or more users of the first vehicle in the detected state. Based on the triggered one or more actions, the system may be configured to control one or more devices (such as a light-based projector device, an interior lighting system, an exterior lighting system, an automotive audio-video system, or a door locking system) associated with the first vehicle. For instance, the system may control the light-based projector device to project a visual alert directly onto a physical surface. The visual alert may be included in the triggered one or more actions and the physical surface may be a window portion of the first vehicle or a physical structure (for example, a portion of road or body of another vehicle in the vicinity of the first vehicle) which may be external to and separate from the first vehicle.

In comparison to traditional safety features in vehicles, the disclosed system may determine various kinds of unsafe activities in the vicinity of the vehicle and may undertake different preemptive and/or counteractive measures in the form of actions to ensure that the user of the vehicle remains safe in all situations. Such actions may be executed by devices associated with the user and/or the vehicle. While the preemptive measures (or actions) help to inform the user in advance about any unsafe activity at the location of the vehicle or in nearby area, the counteractive measures (or actions) may help to discourage people from performing unsafe activities involving the vehicle or other objects (such as other vehicles) in the vicinity of the vehicle.

FIG. 1 is a block diagram that illustrates an exemplary environment for vehicle control for user safety and experience, in accordance with an embodiment of the disclosure. With reference to FIG. 1, there is shown a diagram of a network environment 100. The network environment 100 may include a system 102, a first vehicle 104, a person 106, a second vehicle 108, one or more devices 110, a server 112, and a user device 114. The system 102 may be coupled to the first vehicle 104 and the server 112, via a communication network 116. There is further shown a user 118, who may be associated with the user device 114.

The system 102 may include suitable logic, circuitry, code, and/or interfaces that may be configured to control the one or more devices 110 associated with the first vehicle 104. The one or more devices 110 may be controlled based on one or more actions that may be trigged based on activities of the person 106 or the second vehicle 108 in proximity of the first vehicle 104. By way of example, and not limitation, the one or more devices 110 may be controlled to project information (in the form of visual alert(s), for example) on a physical surface, which may be a window portion of the first vehicle 104 or may be a physical structure external to and separate from the first vehicle 104.

In some embodiments, the system 102 may be external to (i.e. not integrated into) the first vehicle 104. In such embodiments, the system 102 may remotely control the one or more devices 110, via the communication network 116. In some other embodiments, the system 102 may be internal to (i.e. integrated into) the first vehicle 104. Example implementations of the system 102 may include, but are not limited to, one or more of an imaging device (such as a camera), a road-side unit (such as Dedicated short-range communications (DSRC) RSU), a Vehicle-to-Everything (V2X) device, a cellular-V2X device, a smartphone or mobile phone, a wearable or head-mounted electronic device (for example, an eXtended Reality (XR) headset), a gaming device, a mainframe machine, a server, a computer workstation, an edge computing device, a passenger drone support system, and a consumer electronic (CE) device.

The vehicle (such as the first vehicle 104 and the second vehicle 108) may be an autonomous, a semi-autonomous, or a non-autonomous vehicle, as defined, for example, using SAE (Society of Automotive Engineers) automation levels (0, 1, 2, 3, 4, and 5). Examples of the vehicle may include, but are not limited to, a four-wheeled car, a two-wheeled motorbike, a micro-mobility vehicle, a three-wheeled vehicle, a vehicle with more than four wheels (such as a truck), or any land-borne vehicle. A description of such vehicles has been omitted from the disclosure for the sake of brevity.

A person with ordinary skill in the art will understand that the scope of the disclosure may not be limited to the implementation of the first vehicle 104 and the system 102 as two separate entities. In certain embodiments, the functionalities of the system 102 may be incorporated in its entirety or at least partially in the first vehicle 104, without departing from the scope of the disclosure.

Each device of the one or more devices 110 may include suitable logic, circuitry, code, and/or interfaces that may be configured to function based on control instructions from the system 102. Such instructions may be communicated to the one or more devices 110 based on one or more actions. Such actions may be triggered based on whether or not activities of a person or another vehicle proximal to the first vehicle 104 are unsafe for the first vehicle 104 or for one or more users of the first vehicle 104. In an embodiment, the one or more devices 110 may be integrated into the first vehicle 104 as an internal component of the first vehicle 104. In another embodiment, the one or more devices 110 may be coupled to the first vehicle 104 as external component(s). In such an implementation, the one or more devices 110 may mounted on, for example, an outer window portion or a body portion (such as, but not limited to, AB pillars, fenders, or trunk) of the first vehicle 104. Examples of the one or more devices 110 may include, but are not limited to, a light-based projector device 110A, an interior lighting system, an exterior lighting system, an automotive audio-video system, or a door locking system.

The light-based projector device 110A may be configured to project information (such as images, light-based patterns, or signs) by illuminating the physical surface with light signals. Examples of the light-based projector device 110A may include, but are not limited to, a laser-based projector (e.g., uses solid state laser), a digital light processing (DLP) projector, a Liquid Crystal Display (LCD) projector, or an LCoS (Liquid Crystal on Silicon) projector.

The server 112 may include suitable logic, circuitry, and interfaces, and/or code that may be configured to collect information from various data sources, such as crime records, location-specific databases, sensor data acquisition systems (which allow public data access), or other sources. The collected information may be distributed to various devices or systems, such as the system 102 and may include, for example, incident data, location-based crime logs, third-party information related to an environment in which the first vehicle 104 may be present, sensor data of all vehicles within a geo-fence (for example, within a 100 feet radius with the first vehicle 104 at the center), and information related to a location where the first vehicle 104 may be parked or detected in a moving state. In an embodiment, the server 112 may be implemented as a cloud server and may execute operations through web applications, cloud applications, HTTP requests, repository operations, file transfer, and the like. Other example implementations of the server 112 may include, but are not limited to, a database server, a file server, a web server, a media server, an application server, a mainframe server, or a cloud computing server. In at least one embodiment, the server 112 may be implemented as a plurality of distributed cloud-based resources by use of several technologies that are well known to those ordinarily skilled in the art. A person with ordinary skill in the art will understand that the scope of the disclosure may not be limited to the implementation of the server 112 and the system 102 as two separate entities. In certain embodiments, the functionalities of the server 112 may be incorporated in its entirety or at least partially in the system 102, without a departure from the scope of the disclosure.

The user device 114 may include suitable logic, circuitry, code, and/or interfaces that may be configured to receive notifications or alerts (in different forms, such as visual, aural, textual, haptic, or a combination thereof) from the system 102. The user device 114 may be associated with one or more users (such as the user 118) of the first vehicle 104. Examples of the user device 114 may include, but are not limited to, a mobile phone, a smart phone, a tablet device, a personal computer, a gaming console, a media player, a sound system, a smart watch, an infotainment system of the first vehicle 104, a multi-information display (MID) of the first vehicle 104, a smart audio device, or a camera.

A person with ordinary skill in the art will understand that the scope of the disclosure may not be limited to the implementation of the one or more devices 110, the user device 114, and the system 102 as separate entities. In certain embodiments, the functionalities of the one or more devices 110 and the user device 114 may be incorporated in its entirety or at least partially in the system 102, without a departure from the scope of the disclosure.

The communication network 116 may include a communication medium through which the system 102 may communicate with the server 112 and other devices which are omitted from disclosure for the sake of brevity. The communication network 116 may include a wired connection, a wireless connection, or a combination thereof. Examples of the communication network 116 may include, but are not limited to, the Internet, a cloud network, a Wireless Fidelity (Wi-Fi) network, a satellite communication network (such as using a Global Navigation Satellite System (GNSS) satellite constellation), a cellular or mobile wireless network (such as 4th Generation Long-Term Evolution (LTE) or 5th Generation New Radio (NR)), a Personal Area Network (PAN), a Local Area Network (LAN), or a Metropolitan Area Network (MAN). Various devices in the network environment 100 may be configured to connect to the communication network 116 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, satellite communication protocols, and Bluetooth (BT) communication protocols.

In operation, a set of sensors (not shown) associated with the first vehicle 104 may generate a set of sensor data. In an embodiment, such sensors may be a part of a sensor system of the first vehicle 104. In another embodiment, at least one of such sensors may be integrated into electronic devices in vicinity of the first vehicle 104. For example, such sensors may include a vehicle camera, a contact or collision sensor, a parking sensor/camera, a volumetric sensor, a LiDAR, a RADAR, a location sensor, a proximity sensor, a light-sensor, a temperature sensor, a traffic or street camera, a traffic light system, a traffic-rule violation detection system, user devices (e.g., phones), other vehicles (with Vehicle-to-Vehicle (V2V) communication capability), and the like.

In an embodiment, the set of sensor data may be multi-modal data. In multimodal form, the set of sensor data may include outputs of different types of sensors associated with the first vehicle 104. For example, the set of sensor data may include images (from one or more viewpoints), audio data, motion data, location data, point cloud data, object distance values, proximity data, and the like. The server 112 (or an Electronic Control Unit (ECU) of the first vehicle 104) may receive the set of sensor data sensor as input and may generate, using machine learning models, a set of inferences based on the received set of sensor data. Such inferences may include, for example, face recognition data, semantic segmentation data (from images of an environment ambient to the first vehicle 104), object detection data, lane detection data, parking location data, collision or accident prediction data, location-based tags, traffic violations, unsafe activities associated with vehicles or people in vicinity of the first vehicle 104, and the like.

In an embodiment, the first vehicle 104 may transmit at least a portion of the set of sensor data and the set of inferences as sensed information to the system 102. The system 102 may receive the sensed information associated with the first vehicle 104. By way of example, and not limitation, the sensed information may include a geographical location of the first vehicle 104, a plurality of objects (such as the person 106 or the second vehicle 108) in a physical space 122 surrounding the first vehicle 104, and one or more labels to indicate a state or activity of each of the plurality of objects. The physical space 122 may represent a type of environment in which the first vehicle 104 may be present. For example, the physical space may be a parking space, a section of road, a garage, a driveway, or any area available for parking or driving a vehicle.

At any time-instant, the system 102 may detect the state of the first vehicle 104 as one of a parked state or an unparked state (or moving state) based on the sensed information. Thereafter, the system 102 may determine one or more activities of the person 106 or the second vehicle 108 in proximity of the first vehicle 104, based on the sensed information. For example, the person 106 may be 2 feet away from the first vehicle 104 in the parked state or the second vehicle 108 may be tail-gating the first vehicle 104. Details of the determined one or more activities are provided, for example, in FIGS. 3A, and 3B.

Figure 3A:
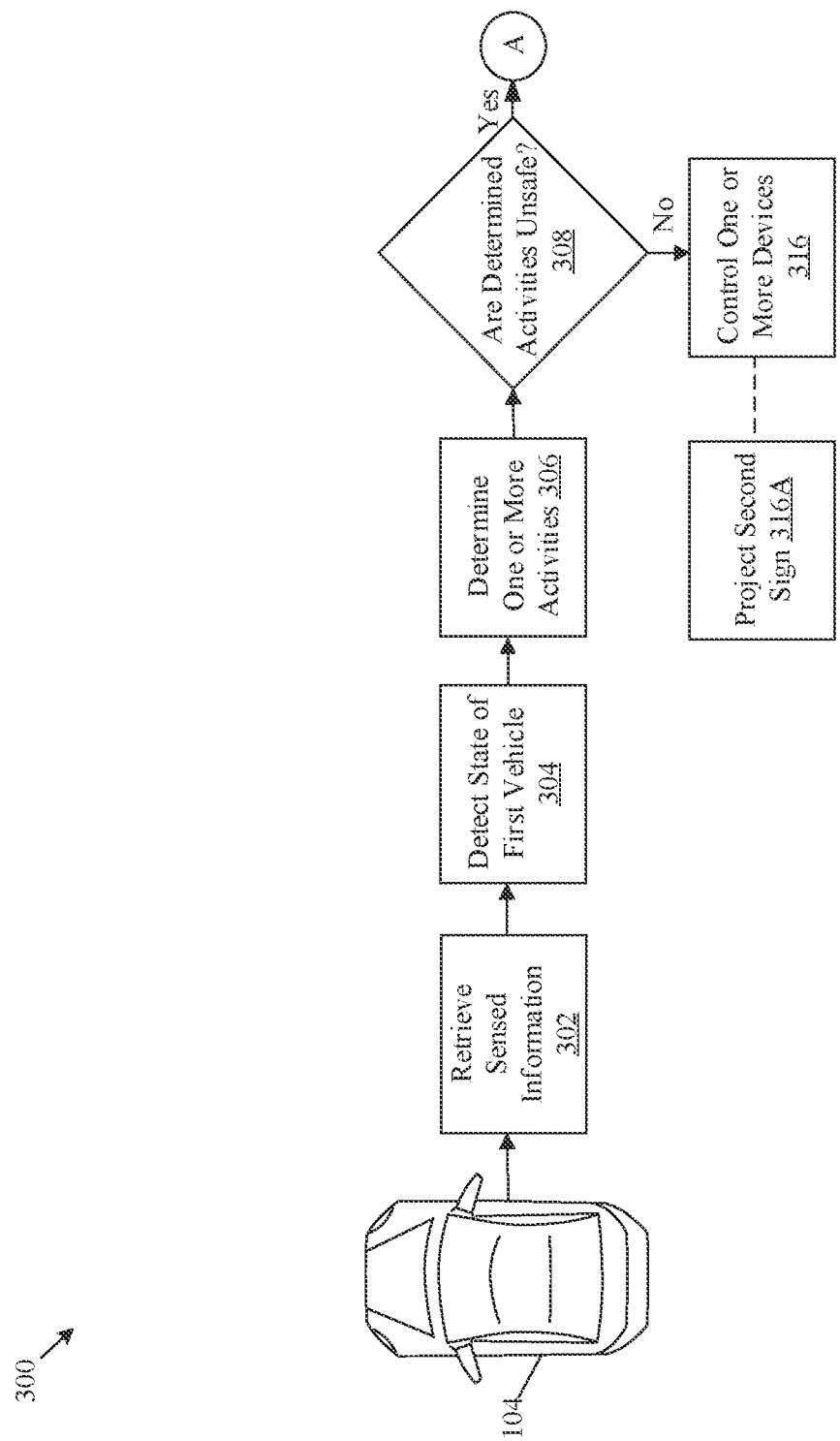
FIGS. 3A and 3B, collectively, depict a block diagram that illustrates exemplary operations for vehicle control for user safety and experience, in accordance with an embodiment of the disclosure.
Figure 3B:
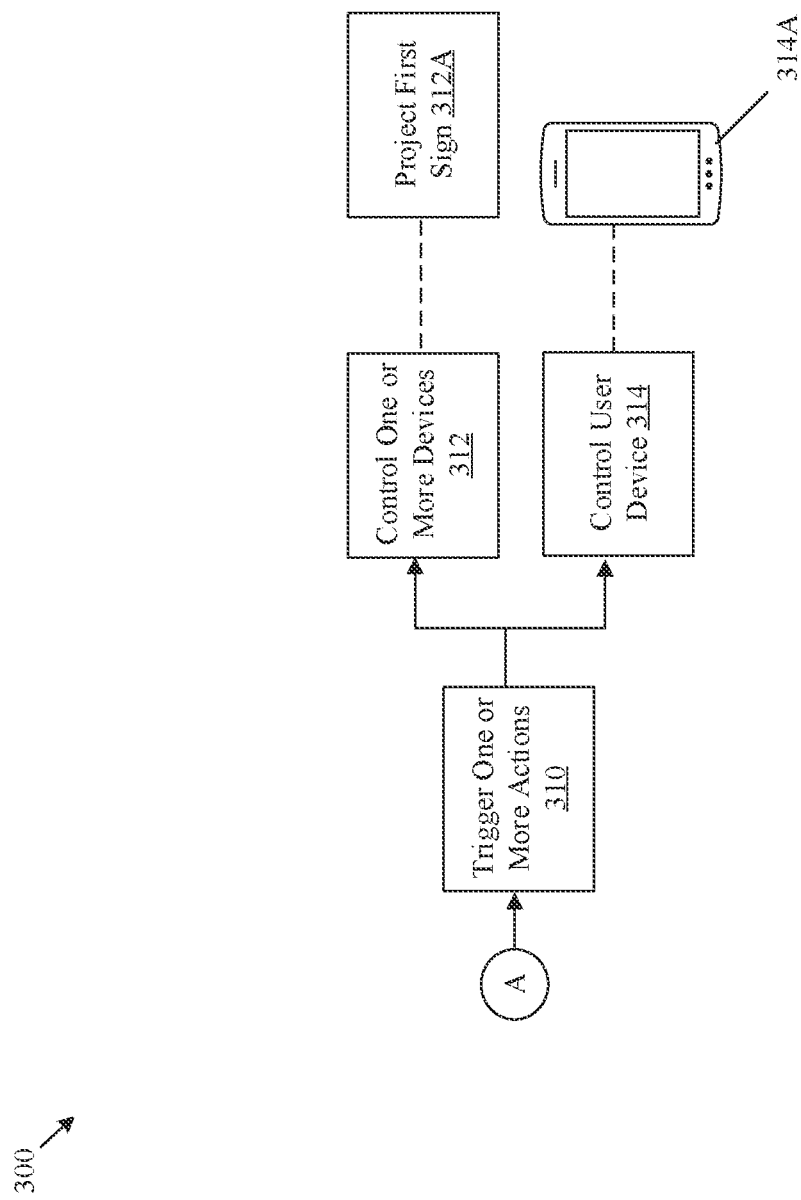

Based on whether or not the determined one or more activities are unsafe for the first vehicle 104 in the detected state or for one or more users (such as the user 118) of the first vehicle 104 in the detected state, the system 102 may trigger one or more actions, as described, for example, in FIGS. 3A, and 3B. The system 102 may control the one or more devices 110 associated with the first vehicle 104 based on the triggered one or more actions. The one or more devices 110 may include the light-based projector device 110A that may be controlled to project a visual alert, included in the triggered one or more actions, directly onto a physical surface. The physical surface may be a window portion 120 of the first vehicle 104 or a physical structure which may be external to and separate from the first vehicle 104. For example, the physical structure may be a road surface, a pavement, a vehicle outer body, a wall structure, or any structure which may appear in an immediate (ambient) surrounding of the first vehicle 104. By way of example, and not limitation, if the first vehicle 104 is in a parked state, the visual alert may include a sign or a warning to caution the one or more users (such as the user 118) about one or more unsafe activities in a vicinity of the first vehicle 104. In some cases, the visual alert may be projected to discourage the unsafe activities of the person 106 or the second vehicle 108 in vicinity of the first vehicle 104.

Figure 2:
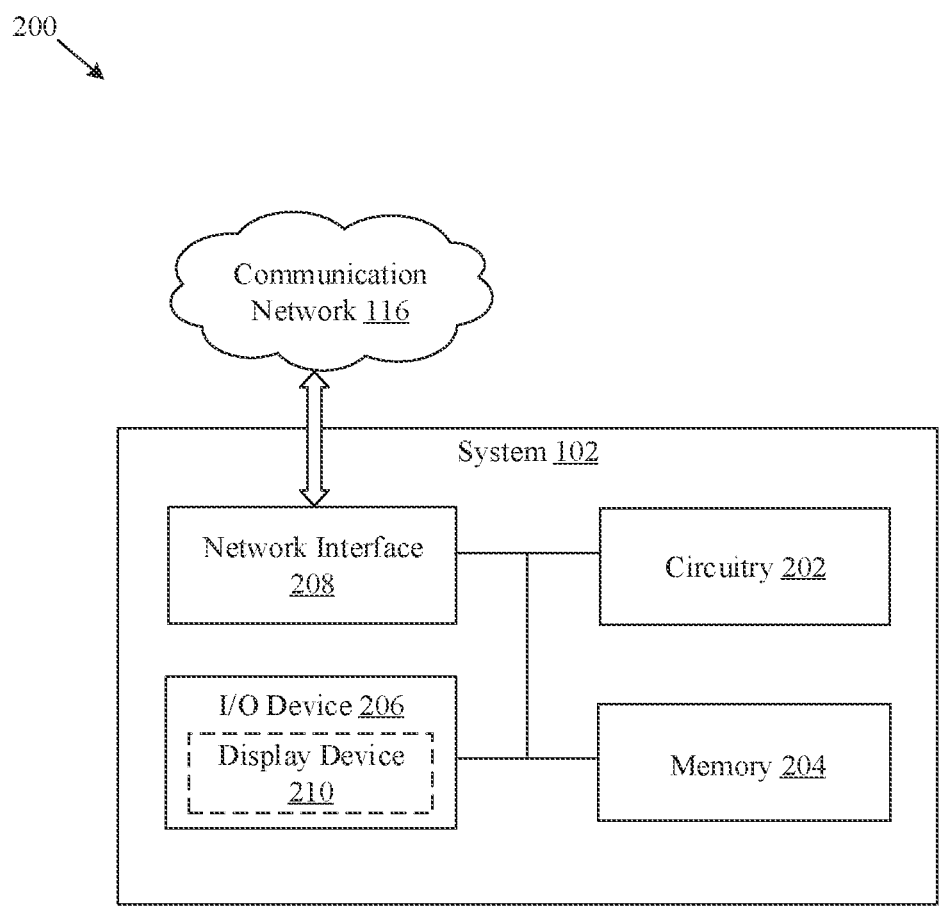
FIG. 2 is a block diagram of an exemplary system of FIG. 1, in accordance with an embodiment of the disclosure.

FIG. 2 is a block diagram of the exemplary system of FIG. 1, in accordance with an embodiment of the disclosure. FIG. 2 is explained in conjunction with elements from FIG. 1. With reference to FIG. 2, there is shown a block diagram 200 of the system 102. The system 102 may include circuitry 202, a memory 204, an input/output (I/O) device 206, and a network interface 208. The circuitry 202 may be communicatively coupled to the memory 204, the I/O device 206, and the network interface 208. The I/O device 206 may include a display device 210, for example.

The circuitry 202 may include suitable logic, circuitry, and/or interfaces that may be configured to execute program instructions associated with different operations to be executed by the system 102. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, and/or interfaces that may be configured to store program instructions to be executed by the circuitry 202. In at least one embodiment, the memory 204 may be configured to store the detected state of the first vehicle 104, the determined one or more activities, the triggered one or more actions, and information associated with visual alerts. Example implementations of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. The I/O device 206 may include various input and output devices, which may be configured to communicate with the circuitry 202. For example, the system 102 may receive a user input via the I/O device 206 to initiate a distress call to one or more mobile devices or emergency services. Thereafter, the system 102 may signal the one or more devices 110 associated with the first vehicle 104 to activate. Examples of the I/O device 206 may include, but are not limited to, a touch screen, a keyboard, a mouse, a joystick, a display device (for example, the display device 210), a microphone, or a speaker.

The display device 210 may include suitable logic, circuitry, and/or interfaces that may be configured to display the user interface elements. In one embodiment, the display device 210 may be a touch-enabled device which may be configured to receive a user input from the user 118 via the display device 210. The display device 210 may include a display unit that may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display unit of the display device 210 may refer to a display screen of a head mounted device (HMD), a smart-glass device, a see-through display, a projection-based display, an electro-chromic display, or a transparent display.

The network interface 208 may include suitable logic, circuitry, interfaces, and/or code that may be configured to facilitate the circuitry 202 to communicate with the first vehicle 104 and/or other communication devices, via the communication network 116. The network interface 208 may be implemented by use of various known technologies to support wireless communication of the system 102 via communication network 116. The network interface 208 may include, for example, an antenna, a radio frequency (RF) transceiver, one or more amplifiers, a tuner, one or more oscillators, a digital signal processor, a coder-decoder (CODEC) chipset, a subscriber identity module (SIM) card, a local buffer circuitry, and the like.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5G NR, code division multiple access (CDMA), time division multiple access (TDMA), satellite communication (such as with a GNSS satellite constellation), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), or Worldwide Interoperability for Microwave Access (Wi-MAX).

The functions or operations executed by the system 102, as described in FIG. 1, may be performed by the circuitry 202. Operations executed by the circuitry 202 are described in detail, for example, in FIGS. 3A and 3B, FIGS. 4A, 4B, and 4C, FIGS. 5A, 5B, and 5C, and FIG. 6.

FIGS. 3A and 3B, collectively, depict a block diagram that illustrates exemplary operations for vehicle control for user safety and experience, in accordance with an embodiment of the disclosure. FIGS. 3A and 3B are explained in conjunction with elements from FIGS. 1 and 2. With reference to FIGS. 3A and 3B, there is shown a block diagram 300 that illustrates exemplary operations from 302 to 314, as described herein. The exemplary operations illustrated in the block diagram 300 may start at 302 and may be performed by any computing system, apparatus, or device, such as by the system 102 of FIG. 1 or FIG. 2. Although illustrated with discrete blocks, the exemplary operations associated with one or more blocks of the block diagram 300 may be divided into additional blocks, combined into fewer blocks, or eliminated, depending on implementation of the exemplary operations.

At 302, sensed information may be received. In an embodiment, the circuitry 202 may receive the sensed information associated with the first vehicle 104. In an embodiment, the sensed information may be received from a first data source which may be, for example, a persistent storage on the first vehicle 104, a cloud server (which may be managed by an information technology (IT) provider or an automaker, for example), a nearby electronic device (such as a DSRC RSU, an edge computing device, a V2X system (such as a V2V system which enables other vehicles in vicinity of the first vehicle 104 to communicate with each other), and the like. In another embodiment, the sensed information may be received directly (in its raw form) from a set of sensors of the first vehicle 104. In another embodiment, the sensed information may be received from the first vehicle 104 and may include data from the first data source and the set of sensors of the first vehicle 104. The received sensed information may include, for example, raw sensor data, results inferred based on analysis of the raw sensor data, post-processed sensor data, and the like.

At 304, a state of the first vehicle 104 may be detected. In an embodiment, the circuitry 202 may be configured to detect the state of the first vehicle 104 as one of a parked state or an unparked state based on the sensed information. In addition to the detection of the state of the first vehicle 104, the circuitry 202 may determine contextual information associated with the detected state. For example, the contextual information may include location data, data related to whether or not the vehicle is locked, data related to whether or not the engine is on, data related to whether or not any occupant is inside the vehicle, data related to whether or not the set of sensors is powered. The location data may include geo-location values (e.g., in terms of coordinates) and a location identifier (such as a parking lot of ABC hotel) of the physical space 122 in which the first vehicle 104 may be present.

At 306, one or more activities may be determined. In an embodiment, the circuitry 202 may be configured to determine the one or more activities of the person 106 or the second vehicle 108 in proximity of the first vehicle 104, based on the sensed information. In an embodiment, the circuitry 202 may be configured to determine the one or more activities based on a determination that the person 106 or the second vehicle 108 lie within a threshold distance (for example, 10 feet) from the first vehicle 104. The person 106 may be, for example, a pedestrian in proximity of the first vehicle, a person with malicious intentions (e.g., burglary or robbery), or a user of another vehicle (different from the first vehicle 104 and the second vehicle 108). Similarly, the second vehicle 108 in proximity of the first vehicle 104 may be, for example, a vehicle that may be parked at a location close to that of the first vehicle 104, a vehicle which trails behind, leads, or tailgates the first vehicle 104, a vehicle at a conflict-point of an intersection, and the like.

In an embodiment, based on the sensed information, the circuitry 202 may identify first features, such as, but not limited to, a distance between the person 106 and the first vehicle 104, a direction in which the person 106 is facing, a posture of the person 106, objects (for example, phone, stones, knife, gun, and the like) carried by the person 106, facial features (for facial/emotion recognition), an action or a stance (such as a fighting stance, a jump stance, a hiding stance, or a crawling stance), and a movement pattern (based on gait characteristics). Based on the first features, the circuitry 202 may determine the one or more activities of the person 106. Examples of such activities of the person 106 may include, but are not limited to, an activity that indicates that the person 106 hides behind the first vehicle 104, an activity that indicates that the person 106 stands in proximity of the first vehicle 104, an activity that indicates that the person 106 touches or attempts to touch the first vehicle 104, an activity that indicates that the person 106 attempts to damage, causes the damage, or attempts to break into the first vehicle 104 or another nearby vehicle (such as the second vehicle 108), and a traffic offense or violation (such as jay-walking, obstructing traffic, or walking against oncoming traffic).

In another embodiment, based on the sensed information, the circuitry 202 may identify second features, such as, but not limited to, a distance between the second vehicle 108 and the first vehicle 104, a direction in which the second vehicle 108 may be parked or may be in motion, a speed or acceleration of the second vehicle 108, a driving pattern associated with the second vehicle 108, a state of occupants (for example, a drunk state, a distressed state, and the like) in the second vehicle 108, and a traffic violation or offense. Based on second first features, the circuitry 202 may determine the one or more activities of the second vehicle 108. Example of the one or more activities of the second vehicle 108 may include, but are not limited to, a tailgating activity, an over-speed activity, an overtaking activity, a stunt, an attempt to block the traffic, a parking maneuver, a turning maneuver, and a stopping maneuver.

At 308, it may be determined whether the determined one or more activities are unsafe for the first vehicle 104 in the detected state or for one or more users of the first vehicle 104 in the detected state. In an embodiment, the circuitry 202 may be configured to determine whether or not the one or more activities are unsafe. In case the one or more activities are determined to be unsafe, control may pass to 310. Otherwise, control may pass to 316.

By way of example, and not limitation, for a given location, an activity may be determined as unsafe if that activity violates laws and regulations applicable for the given location. Such rules or laws may be defined by a local government, a private entity (with property rights over the location), a vehicle owner or user, or a law enforcement agency. In an embodiment, the system 102 (or the server 112) may store a database of unsafe activities associated with vehicles or persons on road or at other locations (such as a parking space or a pavement). The determined one or more activities may be determined as unsafe based on a comparison of such activities with records in the stored database. For example, an activity may be unsafe if a person suspiciously hides behind the first vehicle 104 (in parked state), if a person suspiciously stands in proximity of the first vehicle 104, if a person suspiciously touches the first vehicle 104, if a person damages or breaks into the first vehicle 104 or the second vehicle 108, or if a vehicle tailgates or unsafely overtakes the first vehicle 104 or the second vehicle 108.

In another embodiment, the circuitry 202 may be configured to query an electronic control system of the first vehicle 104 to determine whether or not the one or more activities are unsafe. Based on the query, the circuitry 202 may receive and analyze logs (which may include incidents or alerts, for example) generated by the electronic control system. By way of example, and not limitation, the electronic control system may be one of Advanced Driver Assistance System (ADAS) or an Autonomous Driving (AD) system.

At 310, one or more actions may be triggered. In an embodiment, the circuitry 202 may be configured to trigger the one or more actions based on whether or not the determined one or more activities are unsafe for the first vehicle 104 in the detected state or for one or more users (such as the user 118) of the first vehicle 104 in the detected state. Such actions may include preemptive measures, counteractive measures, or a combination of both preemptive or counteractive measures to ensure that the user 118 of the first vehicle 104 and/or the first vehicle 104 remains safe. Each triggered action may require activation or control of a user device and/or the one or more devices 110 associated with the first vehicle 104.

In an embodiment, the system 102 (or the server 112) may include a database of actions-activity data. In such a database, for a given state of a vehicle (such as the first vehicle 104) or a location of the user 118, each unsafe activity may be mapped to one or more actions. As an example, if the activity is detected before or while a person near the first vehicle 104 attempts to break into the first vehicle 104 (in a parked state), a visual alert may be projected on a physical surface (such as a road surface that may be right outside the first vehicle 104) to alert the user 118 (who may be outside or may be approaching the first vehicle 104) about the detected activity. Other examples of the one or more actions may include, but are not limited to, one or more signals to activate an interior lighting system, an exterior lighting system, an automotive audio-video system, an alarm system, or a door locking system.

At 312, the one or more devices 110 may be controlled. In an embodiment, the circuitry 202 may be configured to control the one or more devices 110 associated with the first vehicle 104, based on the triggered one or more actions. The one or more devices 110 may include a light-based projector device (such as the light-based projector device 110A) that may be controlled to project a visual alert (included in the triggered one or more actions) directly onto a physical surface. The projected visual alert may include a first sign 312A which may caution or alert the user 118 in the proximity of the first vehicle 104, as described, for example, in FIG. 4A.

The physical surface may be a window portion (such as the window portion 120) of the first vehicle 104 or a physical structure which may be external to and separate from the first vehicle 104. For example, the physical structure may be a road surface, a pavement, a vehicle outer body, a wall structure, or any structure which may appear in an immediate (ambient) surrounding of the first vehicle 104.

In some embodiments, the circuitry 202 may select the physical structure for the projection based on factors, such as a moving direction of the vehicle, a location of the user, a location of the person (who may be associated with the unsafe activity), or a combination thereof. In these or other embodiments, the circuitry 202 may determine a location and direction in which the visual alert may be projected, with respect to the location of the first vehicle 104. For example, if the physical structure is a portion of a road or a section of pavement, then the location of the physical structure for the projection may be selected based on the determined location and direction. In this case, the first vehicle 104 may include a plurality of light-based projector devices to cover the projection in multiple directions.

At 314, a user device 314A may be controlled. In an embodiment, the circuitry 202 may be configured to control the user device 314A associated with the user 118 of the first vehicle 104 to display a visual alert. The visual alert may include first information that may caution the user 118 in proximity of the first vehicle 104. For example, the first information may be a danger sign, a text-based sign, or a graphic symbol that cautions the user 118 about an unsafe activity associated with the first vehicle 104 or another nearby vehicle. Details of the control of the user device 314A are provided, for example, in FIGS. 4A and 4B.

At 316, the one or more devices 110 may be controlled. In an embodiment, the circuitry 202 may be configured to control the one or more devices 110 associated with the first vehicle 104. The one or more devices 110 may include a light-based projector device (such as the light-based projector device 110A) that may be controlled to project a visual alert. The projected visual alert may include a second sign 316A that may inform one or more users (such as the user 118) in the proximity of the first vehicle 104 about a level of safety associated with the area around the first vehicle 104, as described, for example in FIG. 4C.

Figure 4A:
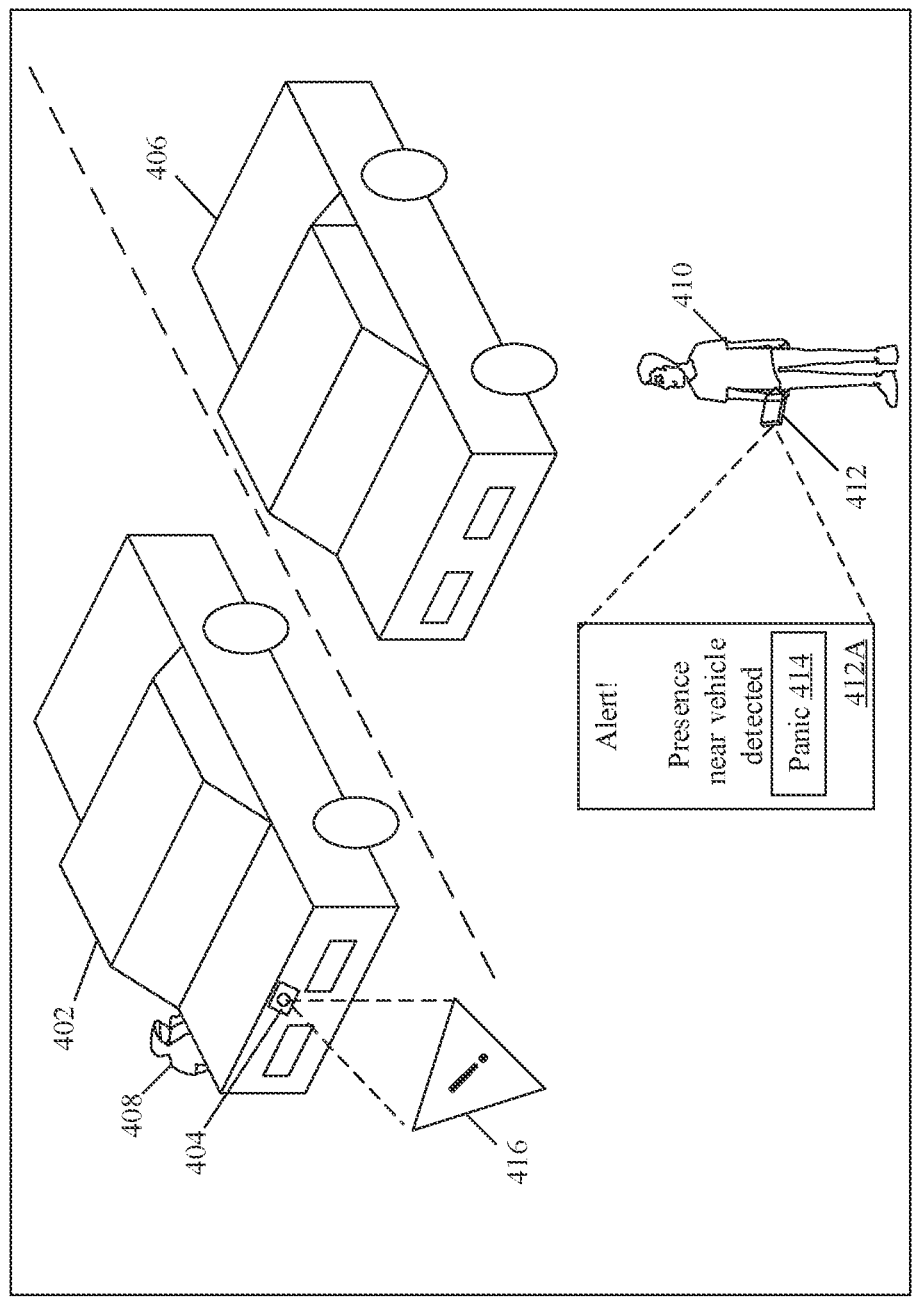
FIG. 4A is a diagram that illustrates an exemplary scenario of vehicle control for user safety in case a vehicle is in a parked state, in accordance with an embodiment of the disclosure.
Figure 4B:
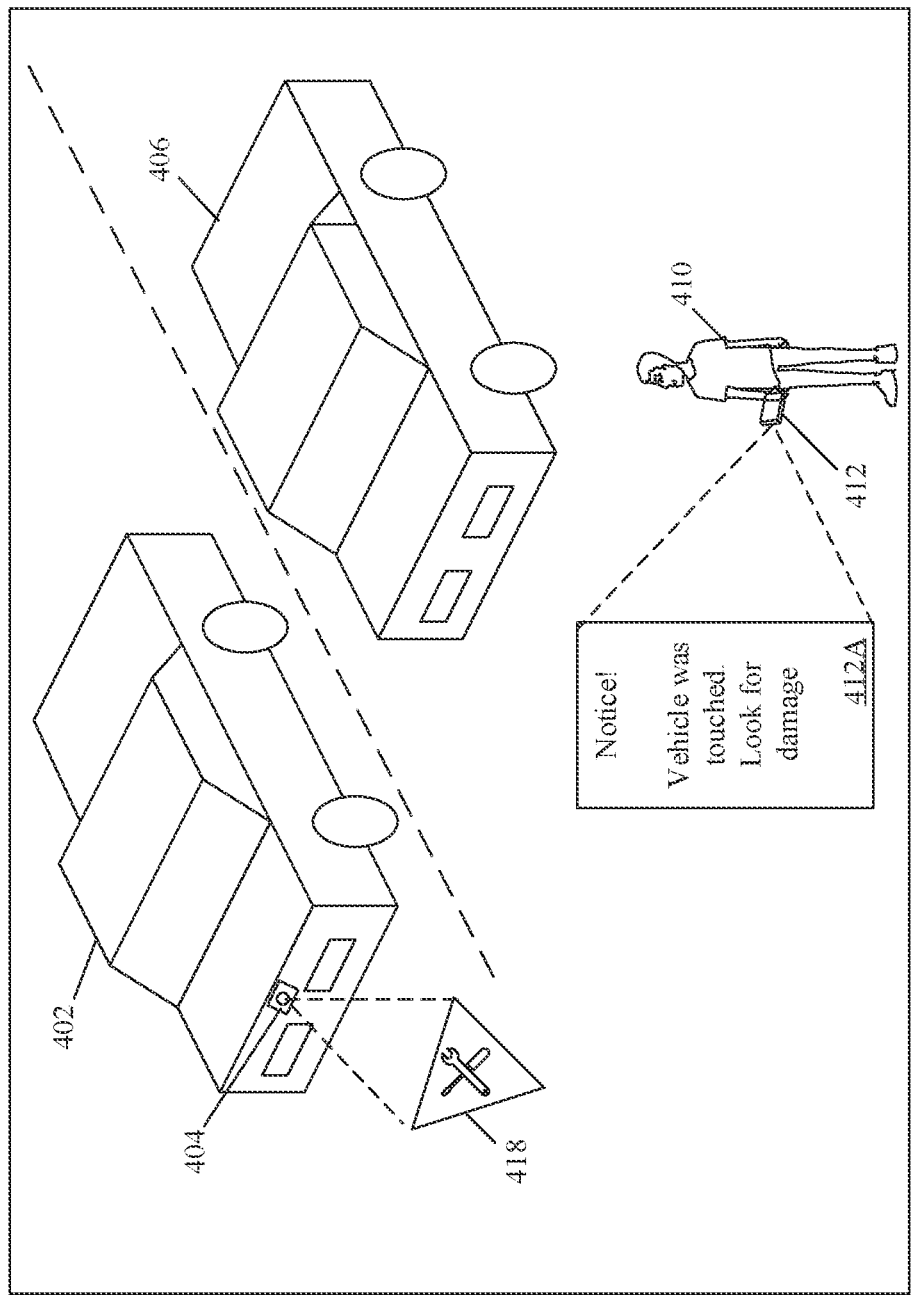
FIG. 4B is a diagram that illustrates an exemplary scenario of vehicle control for user safety in case a vehicle is in a parked state, in accordance with an embodiment of the disclosure.
Figure 4C:
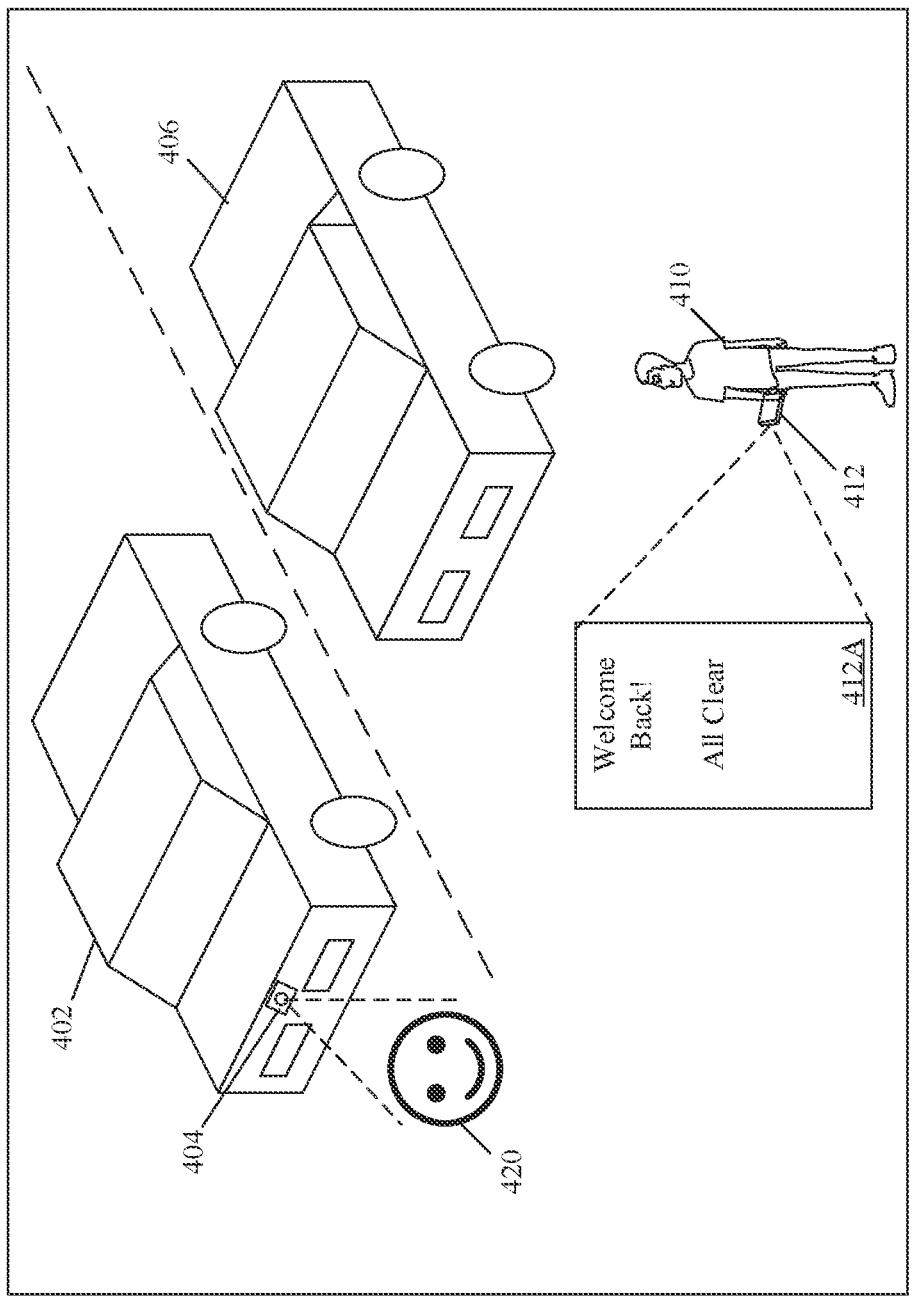
FIG. 4C is a diagram that illustrates an exemplary scenario of vehicle control for user safety in case a vehicle is in a parked state, in accordance with an embodiment of the disclosure.

FIG. 4A is a diagram that illustrates an exemplary scenario of vehicle control for user safety in case a vehicle is in a parked state, in accordance with an embodiment of the disclosure. FIG. 4A is explained in conjunction with elements from FIGS. 1, 2, 3A, and 3B. With reference to FIG. 4A, there is shown an exemplary scenario 400A which depicts a first vehicle 402. There is further shown a light-based projector device 404, and a second vehicle 406. In FIGS. 4A, 4B, and 4C, there is further shown a user 410 of the first vehicle 104. The user 410 is shown outside of the first vehicle 402. There is further shown a user device 412 associated with the user 410.

At any time-instant, the circuitry 202 may be configured to receive sensed information associated with the first vehicle 402. Based on the sensed information, the circuitry 202 may be configured to detect a state of the first vehicle 402 as a parked state. The circuitry 202 may be configured to determine one or more activities of a person 408 in proximity of the first vehicle 402, based on the sensed information. As shown, for example, the determined one or more activities may indicate that the person 408 suspiciously hides behind or stands in the proximity of the first vehicle 402, while the first vehicle 402 is detected to be in the parked state. The circuitry 202 may be configured to trigger one or more actions based on the determination that the one or more activities are unsafe for the first vehicle 402 in the parked state or for the user 410 of the first vehicle 402.

The circuitry 202 may be configured to control one or more devices (such as the light-based projector device 404) associated with the first vehicle 402 based on the triggered one or more actions. The light-based projector device 404 may be controlled to project a visual alert directly on to a physical surface. For example, the physical surface a portion of road, 1-2 feet away from a rear section of the first vehicle 402.

In an embodiment, the projected visual alert may include a first sign which cautions or alerts the one or more users (such as the user 410) in proximity of the first vehicle 402. The visual alert may also include direction information which informs the one or more users 410 about a direction in which the person 408 may be present. In FIG. 4A there is shown a first sign (such as a danger sign 416), which is directly projected onto a physical surface (such as a portion of road). While the physical surface may be external to and separate from the first vehicle 402, the physical surface may still lie within the physical space 122 or in an immediate surrounding of the first vehicle 402. In this case, the physical space 122 may be a parking space with one or more vehicles in the parked state.

In an embodiment, the circuitry 202 may be configured to control the user device 412 associated with the user 410. The user device 412 may display the visual alert. The visual alert may include first information 412A which cautions the one or more users in proximity of the first vehicle 402 about the determined one or more activities (unsafe or safe). In FIG. 4A, the first information 412A includes a warning message 'Alert! Presence near the vehicle detected' on the user device 412.

The user device 412 may display a user interface (UI) element 414 as a panic button. Based on a user selection of the panic button (i.e. the UI element 414), the user device 412 may transmit a message that may include a distress call to one or more mobile devices and/or emergency services. In addition, the user device 412 may signal the one or more devices (such as the one or more devices 110) associated with the first vehicle 402 to activate. As an example, the user device 412 may transmit a danger or warning message to a mobile digital computer (i.e. a mobile device) of a law enforcement agency, an emergency service (such as a call to an ambulance or a fire department), or a mobile phone associated with a family member or a friend of the user 410. The danger or warning message may be transmitted to inform that the user 410 may be unsafe and may require help to ensure that the user 410 remains safe. The disclosed system may enhance the user safety in all situations where the user 410 may likely be unsafe while the first vehicle 402 is in a parked state.

FIG. 4B is a diagram that illustrates an exemplary scenario of vehicle control for user safety in case a vehicle is in a parked state, in accordance with an embodiment of the disclosure. FIG. 4B is explained in conjunction with elements from FIGS. 1, 2, 3A, 3B, and 4A. With reference to FIG. 4B, there is shown a scenario 400B in which the person 408 may be unassociated with the one or more users (such as the user 410) of the first vehicle 402 and the determined one or more activities may include an unsolicited interaction of the person 408 with the first vehicle 402. In the scenario 400B, the first vehicle 402 may be detected to be in the parked state. The unsolicited interaction may include instances where the person 408 may have touched the first vehicle 402 or may have caused damage to the first vehicle 402. For example, the person 408 may have touched, attempted to damage, break into, or hack into the first vehicle 402 in the parked state. Alternatively, the second vehicle 406 may have accidentally or deliberately hit the first vehicle 402 in the parked state.

The circuitry 202 may be configured to determine a damage to the first vehicle 402 based on the determined one or more activities. Thereafter, one or more actions may be triggered based on the determined damage. In an embodiment, the circuitry 202 may be configured to control the light-based projector device 404 to project the visual alert that may include the third sign 418. The third sign 418 may inform the one or more users (such as the user 410) in proximity of the first vehicle 402 about the damage to the first vehicle 402. As shown, the third sign 418 may be projected directly onto a physical surface (such as on the road). The physical surface is shown to be external to and separate from the first vehicle 402, but within an immediate surrounding of the first vehicle 402.

In an embodiment, the circuitry 202 may control the user device 412 associated with the user 410 to alert the user 410 about the damage to the first vehicle 402. As the user 410 is informed in advance (i.e. before the user 410 enters the first vehicle 402) about the damage, the disclosed system 102 may ensure that the user 410 remains safe even if the first vehicle 402 is damaged or disturbed. As shown in FIG. 4B, the user device 412 may display a visual alert. The visual alert may include first information 412A, such as a warning message 'Notice! Vehicle was touched. Look for damage'.

In an embodiment, the circuitry 202 may be configured to determine an indication of whether or not an area within a threshold distance from the first vehicle 402 is safe, while the detected state of the first vehicle 402 is the parked state. The threshold distance from the first vehicle 402 may include, for example, a distance of 10 feet, a distance of 50 feet, a distance of 100 feet, a distance of 200 feet, a distance of 500 feet, and the like. In an embodiment, the circuitry 202 may be configured to receive a user input, via the user device 412 or an I/O device (such as the I/O device 206), to set the threshold distance. The indication may be determined based on the sensed information, the determined one or more activities, and information related to unsafe activities in locations proximal to the first vehicle 402. For example, if the first vehicle 402 is parked in an open parking space (which may be next to a hotel) and a case of burglary (i.e. an unsafe activity) is detected at a nearby location (e.g., 100 yards from the open parking space), then an indication may be determined that an area within 100 yards of the open parking space may be unsafe to park the first vehicle 402 or even stay with the first vehicle 402. In such a case, the sensed information may include, for example, information associated with a geographical location of the first vehicle 402, a current time of day, some news about recent incidents in area around the geographical location, and the like. Based on the indication, one or more actions may be trigged. For example, the circuitry 202 may alert the user 410 about the unsafe activities in locations proximal to the first vehicle 402. As the user 410 is alerted in advance, the user 410 may be able to remove the first vehicle 402 from the open parking space and park the first vehicle 402 at a safer location. In an embodiment, the circuitry 202 may control the user device 412 to recommend alternate parking spaces at different locations (which may be safer in comparison to a current location of the first vehicle 402).

FIG. 4C is a diagram that illustrates an exemplary scenario of vehicle control for user safety in case a vehicle is in a parked state, in accordance with an embodiment of the disclosure. FIG. 4C is explained in conjunction with elements from FIGS. 1, 2, 3A, 3B, 4A, and 4B. With reference to FIG. 4C, there is shown a scenario 400C in which the user 410 is informed about a level of safety associated with the area around the first vehicle 402. The circuitry 202 may be configured to control the light-based projector device 404 to project a visual alert. The visual alert may include a second sign 420 which may inform the one or more users (such as user 410) in the proximity of the first vehicle 402 about a level of safety associated with the area around the first vehicle 402. As shown, for example, the second sign 420 (such as smiley face) may be projected directly onto a physical surface (such as on road or pavement) to indicate that it may be safe to approach the first vehicle 402. The physical surface may be external to and separate from the first vehicle 402. The projection may be based on the sensed information, the determined one or more activities, and information related to unsafe activities in locations proximal to the first vehicle 402.

In an embodiment, the user device 412 may also display a visual alert. For example, the visual alert may include first information 412A as a message 'welcome back! all clear' to inform the one or more users (such as the user 410) that it may be safe to approach the first vehicle 402. In FIGS. 4A, 4B and 4C, the physical surface and the visual alerts 416, 418, and 420 are merely provided as examples and should not be construed as limiting for the disclosure. The present disclosure may be applicable to other types of physical surfaces outside the first vehicle 402 (or any of the window portions of the first vehicle 402) and other types of visual alerts, without departing from the scope of the disclosure.

Figure 5A:
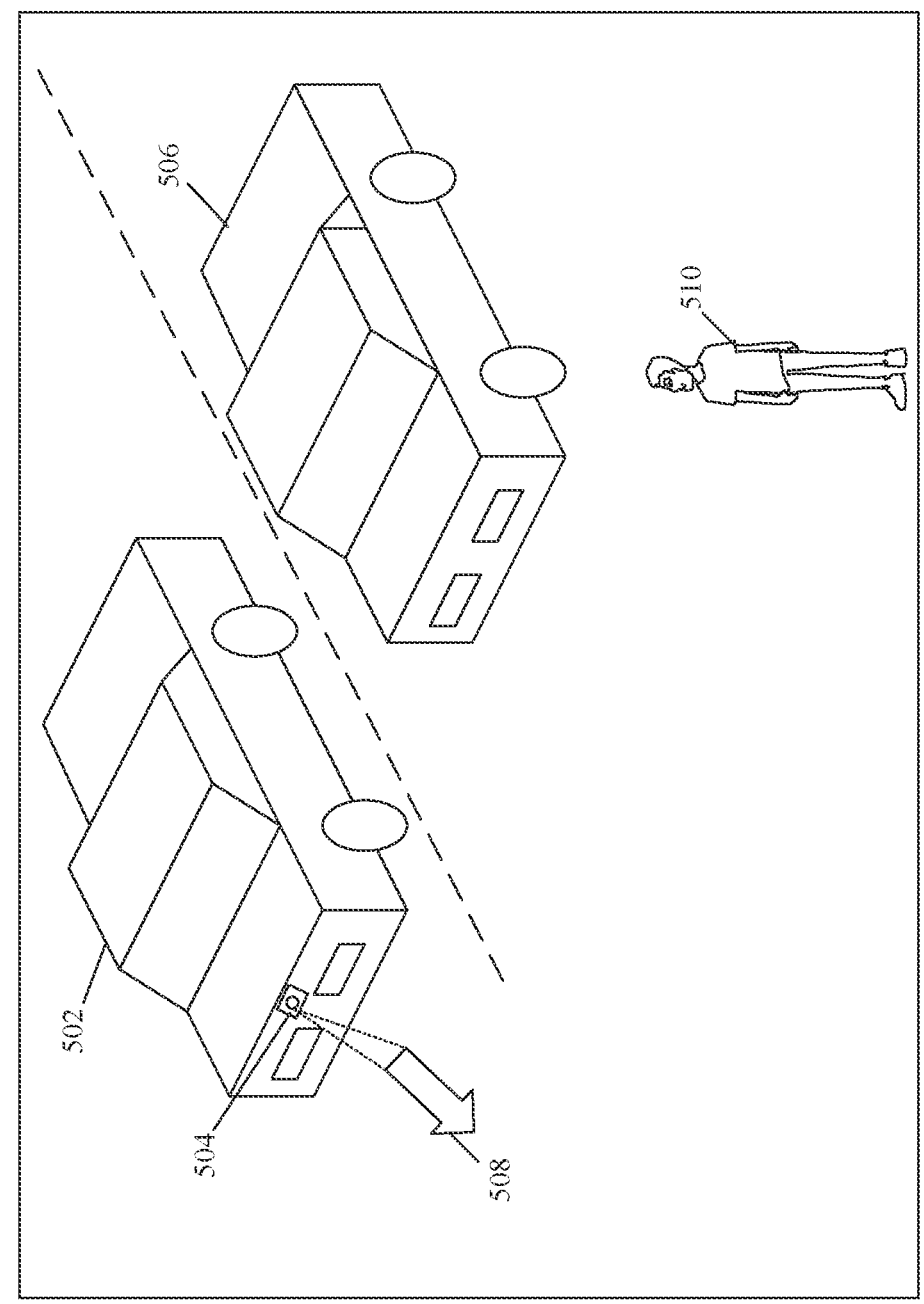
FIG. 5A is a diagram that illustrates an exemplary scenario of vehicle control for user safety in case the vehicle is in an unparked state, in accordance with an embodiment of the disclosure.

FIG. 5A is a diagram that illustrates an exemplary scenario of vehicle control for user safety in case the vehicle is in an unparked state, in accordance with an embodiment of the disclosure. FIG. 5A is explained in conjunction with elements from FIGS. 1, 2, 3A, 3B, 4A, 4B, and 4C. With reference to FIG. 5A, there is shown an exemplary scenario 500A which depicts a first vehicle 502. There is further shown a light-based projector device 504 mounted on the first vehicle 502 and a second vehicle 506. In FIG. 5A, there is further shown a person 510 who is moving towards the first vehicle 502.

The circuitry 202 may be configured to receive sensed information associated with the first vehicle 502. The circuitry 202 may be configured to detect a state of the first vehicle 502 as a unparked state based on the sensed information. Details of the retrieval of the sensed information and determination of the state of the first vehicle 502 are provided, for example, in FIGS. 3A and 3B.

In an embodiment, the determined one or more activities may include an activity in which a driver of the first vehicle 502 may be backing-out the first vehicle 502 from a parking spot. Based on the determined one or more activities, the circuitry 202 may be configured to select a physical surface on ground in a direction in which the first vehicle 502 may move while backing out from the parking spot. The visual alert may be projected on the selected projection surface and may include a fourth sign (such as arrow 508) to indicate direction in which the first vehicle 502 may continue to move. As an example, the first vehicle 502 may transition from a parked state to the unparked state. While transitioning, the first vehicle 502 may perform a reversing maneuver from the parking spot. The direction associated with the movement of the first vehicle 502 may be projected to alert the person 510 in proximity of the first vehicle 502.

Figure 5B:
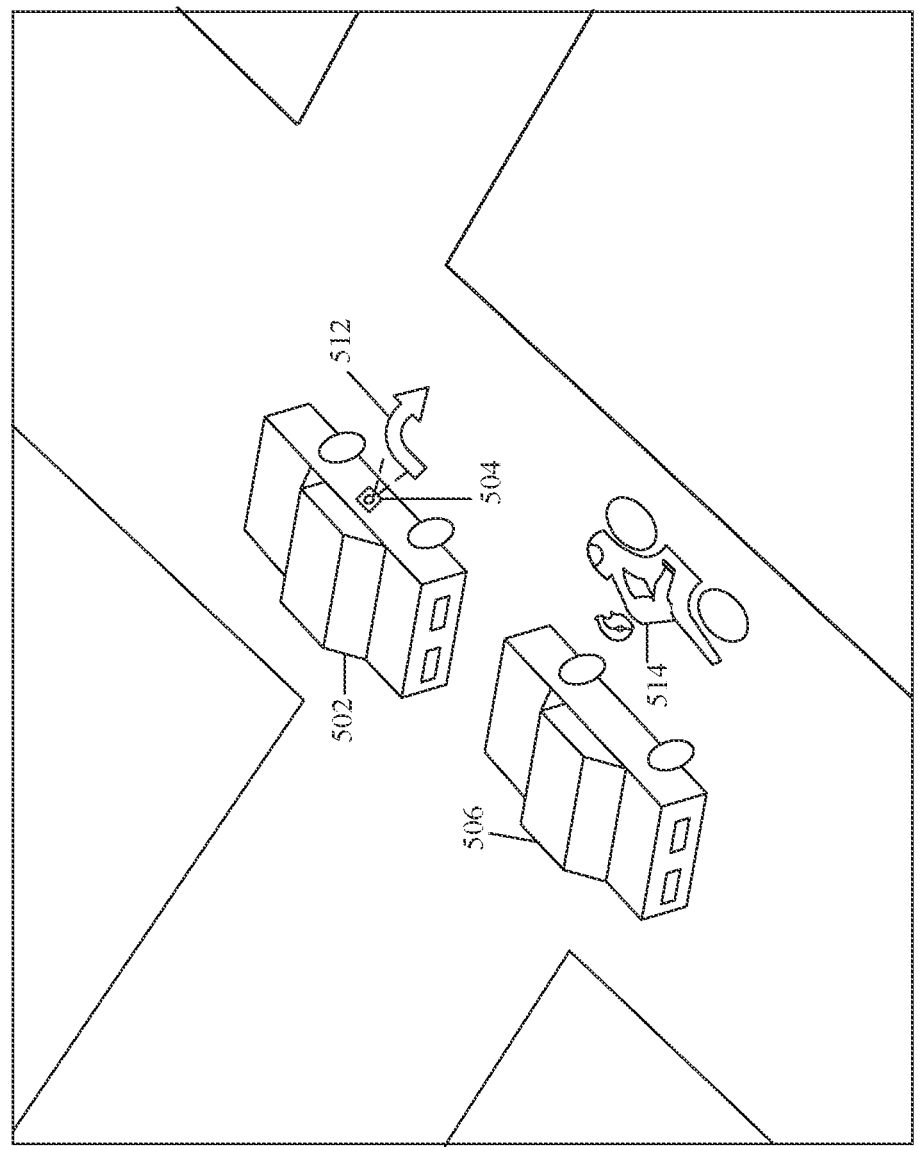
FIG. 5B is a diagram that illustrates an exemplary scenario of vehicle control for user safety in case the vehicle is in an unparked state, in accordance with an embodiment of the disclosure.

FIG. 5B is a diagram that illustrates an exemplary scenario of vehicle control for user safety in case the vehicle is in an unparked state, in accordance with an embodiment of the disclosure. FIG. 5B is explained in conjunction with elements from FIGS. 1, 2, 3A, 3B, 4A, 4B, 4C, and 5A. With reference to FIG. 5B, there is shown an exemplary scenario 500B, in which the first vehicle 502 appears to move towards an intersection on the road.

In an embodiment, the circuitry 202 may be configured to detect a direction in which the first vehicle 502 in a moving state (i.e. an unparked state) may be about to take a turn on road. The direction may be determined based on the sensed information. The circuitry 202 may be configured to determine a third vehicle 514 which trails behind the first vehicle 502. The third vehicle 514 may be determined based on the sensed information.

In order to alert the third vehicle 514, the circuitry 202 may control the light-based projector device 110A to project a visual alert on a physical surface (for example, a portion of road surface or a pavement). The physical surface may be present in an immediate surrounding of the first vehicle 502. The visual alert may include a turn sign to indicate the direction in which the first vehicle 502 may be about to take the turn. The turn sign may alert the second vehicle 506 and the third vehicle 514 in proximity of the first vehicle 502. As shown, for example, the turn sign is an arrow 512 that indicates an intention of a driver of the first vehicle 502 to take a turn on the road. In FIGS. 5A and 5B, the projected visual alerts 508 and 512 are merely provided as examples and should not be construed as limiting for the disclosure. The present disclosure may be applicable to other forms of a visual alert, without departing from the scope of the disclosure.

Figure 5C:
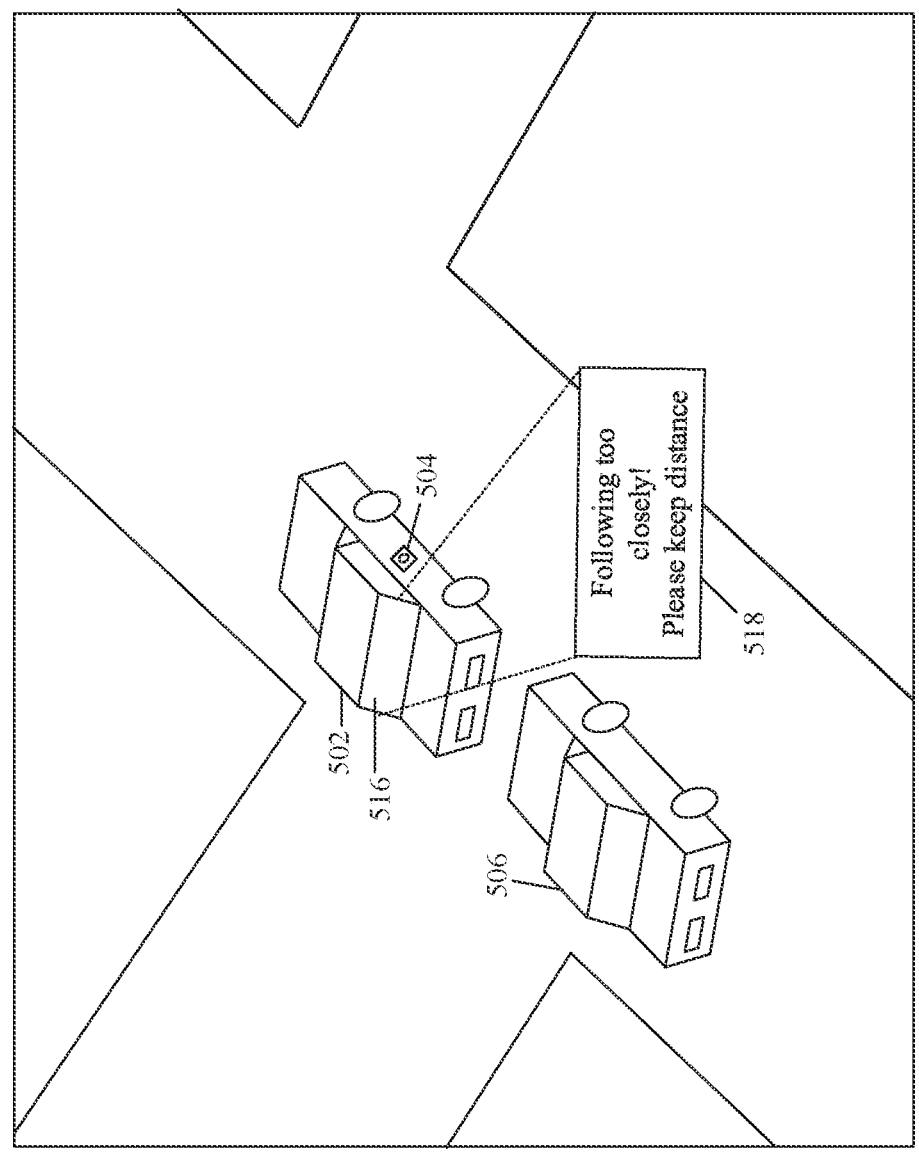
FIG. 5C is a diagram that illustrates an exemplary scenario of vehicle control for user safety in case the vehicle is in an unparked state, in accordance with an embodiment of the disclosure.

FIG. 5C is a diagram that illustrates an exemplary scenario of vehicle control for user safety in case the vehicle is in an unparked state, in accordance with an embodiment of the disclosure. FIG. 5C is explained in conjunction with elements from FIGS. 1, 2, 3A, 3B, 4A, 4B, 4C, 5A, and 5B. With reference to FIG. 5C, there is shown an exemplary scenario 500C in which the second vehicle 506 is trailing the first vehicle 502.

In an embodiment, the determined one or more activities may include an activity in which the second vehicle 506 tailgates the first vehicle 502 while the first vehicle 502 may be detected to be in the moving state. As an example, the circuitry 202 may determine whether or not a distance between the second vehicle 506 and the first vehicle 502 is within a threshold. The threshold may be a minimum distance that two vehicles should maintain to avoid collision. The circuitry 202 may be configured to determine a first set of projection parameters based on the sensed information and the determined one or more activities. Thereafter, the circuitry 202 may be configured to control the light-based projector device 504 to project a visual alert directly onto the physical surface, such as a window portion 516 of the first vehicle 502. The visual alert may include a warning to deter the second vehicle 506 from tailgating the first vehicle 502. The projection may be based on the determined first set of projection parameters. Examples of such projection parameters may include, but are not limited to, a size of projection, a color value to be used for the projection, and a strength (light intensity) of the projection. As shown, for example, the visual alert includes the first information 518 as a warning message 'Following too closely! Please keep distance' on the window portion 516 of the first vehicle 502.

In an embodiment, the circuitry 202 may be configured to determine a second set of projection parameters, based on the sensed information and a direction in which a vehicle or a person may be moving with respect to the first vehicle 502. The second set of projection parameters may include, for example, a selection of the physical surface on the road in the direction in which the vehicle or the person may be moving with respect to the first vehicle 502. As an example, if the second vehicle 506 is present on the right side of the first vehicle 502, the visual alert may be projected on a physical surface present on the right side of the first vehicle 502. The projection surface may be a window portion on the right door of the first vehicle 502 or a physical structure (such as a portion of road or pavement) on the right side of the first vehicle 502.

In some scenarios, the driver or the first vehicle 502 may be a student or an old age person. In such scenarios, a visual alert may be projected to caution the second vehicle 506 in proximity of the first vehicle 502 to keep distance from the first vehicle 502. For example, the visual alert may include first information as a warning message 'Student driver! Please keep distance', or 'Senior citizen. Please, keep distance'.

In some other scenarios, while the first vehicle 502 may be in an unparked state, the circuitry 202 may receive sensed information that may indicate a presence of a child inside the first vehicle 502. In such scenarios, the visual alert may be projected on, for example, a rear window of the first vehicle 502 to caution the second vehicle 506 (in proximity of the first vehicle 502) to keep distance from the first vehicle 502. For example, the first information may include a warning message 'baby on board, please keep distance' on the window portion 516 of the first vehicle 502.

In some other scenarios, while parking the first vehicle 502, the circuitry 202 may receive sensed information that may indicate that the first vehicle 502 is about to be parked close to a fire hydrant or a no parking sign. In such scenarios, the visual alert may be projected on a dashboard of the first vehicle 502 to alert the driver of the first vehicle 502 about the fire hydrant. For example, the visual alert may include first information as a warning message 'Fire hydrant! Don't park here', or 'No parking, don't park here'.

In some other scenarios, while a user exits the first vehicle 502 in the parked state, the circuitry 202 may receive sensed information that may indicate a hyperlocal location (such as a gas station or a store) the user plans to reach after exiting from the first vehicle. In such scenarios, the visual alert may be projected on a portion of ground next to the door (which the user uses to exit from the first vehicle 502) of the first vehicle 502. The visual alert may include direction signs to inform the user about the direction in which the user may need to move to reach the hyperlocal location.

Figure 6:
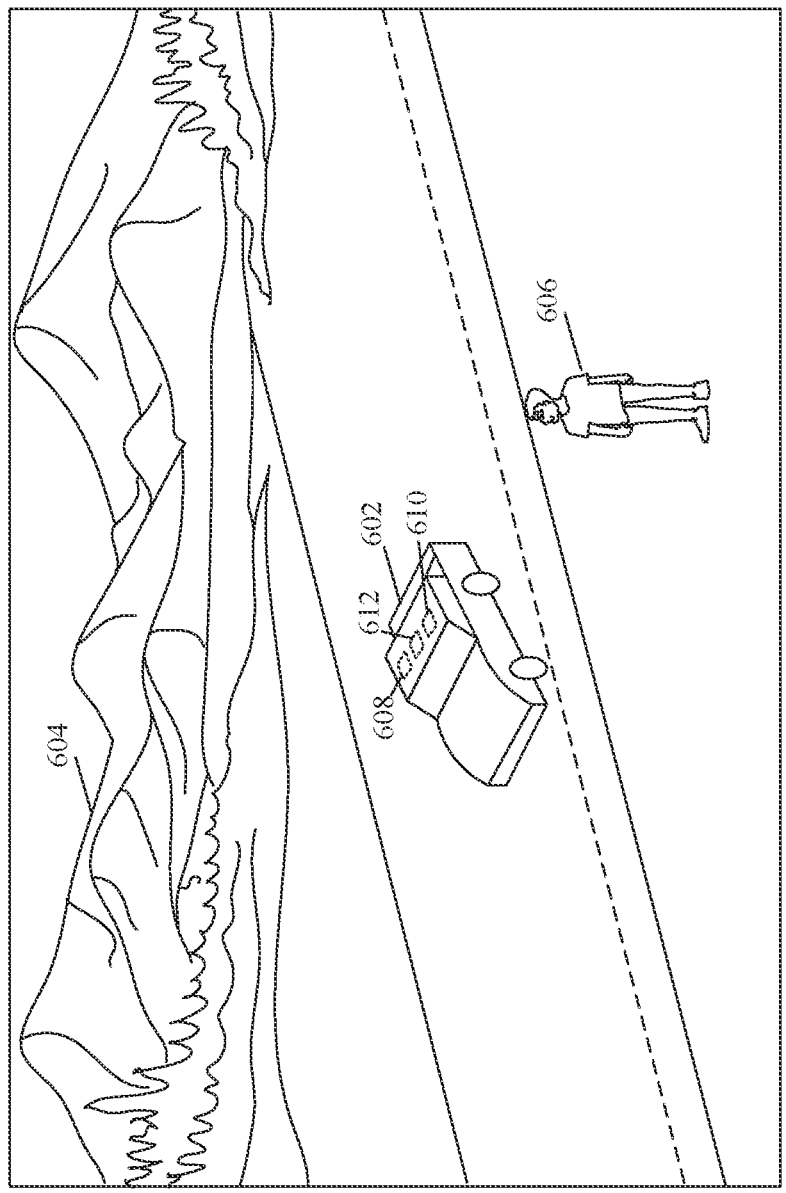
FIG. 6 is a diagram that illustrates an exemplary scenario of vehicle control for user experience, in accordance with an embodiment of the disclosure.

FIG. 6 is a diagram that illustrates an exemplary scenario for scenario of vehicle control for user experience, in accordance with an embodiment of the disclosure. FIG. 6 is explained in conjunction with elements from FIGS. 1, 2, 3A, 3B, 3C, 4A, 4B, 4C, 5A, 5B, and 5C. With reference to FIG. 6, there is shown a scenario 600 that depicts a first vehicle 602 and an environment (such as mountains 604 and hills) in which the first vehicle 602 is present. There is further shown a user 606 approaching the first vehicle 602.

At any time-instant, the circuitry 202 may be configured to detect the first vehicle 602 in the parked state. The circuitry 202 may be further configured to detect a movement of one or more users (such as the user 606) towards the first vehicle 602 in the parked state. The movement may be detected, based on the sensed information. The sensed information may include, for example, a location of the first vehicle 602, a list of objects or landmarks (such as the mountains 604) in proximity of the location of the first vehicle 602, a current ambient temperature, day-time information, traffic conditions of a region around the location of the first vehicle 602, and weather information. Based on the detected movement and the sensed information, the circuitry 202 may be further configured to activate a second device of one or more devices associated with the first vehicle 602. The second device may be one of an interior lighting system 608, an exterior lighting system, an automotive audio-video system 610, or a door locking system 612. By way of example, and not limitation, the interior lighting system 608 may adjust a color and an intensity of light in the seating area of the first vehicle 602, based on day-time information associated with the location of the first vehicle 602. The Heating, Ventilation, and Air Conditioning (HVAC) system of the first vehicle 602 may adjust a temperature of the first vehicle 602 based on the ambient temperature. The automotive audio-video system 610 may turn on the infotainment system and may deactivate the door locking system 612 based on the detected movement of the user 606 towards the first vehicle 602.

In one scenario, the first vehicle 602 may be parked in a national park on a cold winter day right before sunset. The datapoints in the sensed information are provided in Table 1, as follows:

TABLE 1

| Sensed Information | |
| --- | --- |
| Location | National Park |
| Temperature | Cold |
| Lighting | Sunset |

In such a scenario, the circuitry 202 may control one or more devices associated with the first vehicle 602 based on a first setting, to adjust a temperature, a lighting, a display, and an audio-video playback inside the passenger compartment of the first vehicle 602. An example of the first setting is provided in Table 2, as follows:

TABLE 2

| First Setting | |
| --- | --- |
| Interior Light | Warm Sunset Color |
| Temperature | Set to warmer than usual (cold) |
| Music | Epic soundtrack relevant to location |

In another scenario, the first vehicle 602 may be parked in a beach spot on a hot day at nighttime. The datapoints in the sensed information are provided in Table 3, as follows:

TABLE 3

| Sensed Information | |
| --- | --- |
| Location | Beach |
| Temperature | Hot |
| Lighting | Night |

In such a scenario, the circuitry 202 may control one or more devices associated with the first vehicle 602 based on a second setting, to adjust a temperature, a lighting, a display, and an audio-video playback inside the passenger compartment of the first vehicle 602. An example of the second setting is provided in Table 4, as follows:

TABLE 4

| Second Setting | |
| --- | --- |
| Interior Light | Firework projection with 360RA (Reality Audio) object audio |
| Temperature | Set to cooler |
| Music | Epic 360RA soundtrack |

In an embodiment, the circuitry 202 may receive the current ambient temperature as 60 degrees Fahrenheit and luminous intensity information as a categorical variable (for example, dim or low light) or a definite value (for example, 800 lumens). The circuitry 202 may be configured to control the HVAC to increase the temperature inside the passenger compartment of the first vehicle 602 to 80 degrees Fahrenheit and may turn on the interior lighting system 608 based on the received current ambient temperature and the luminous intensity information.

Figure 7:
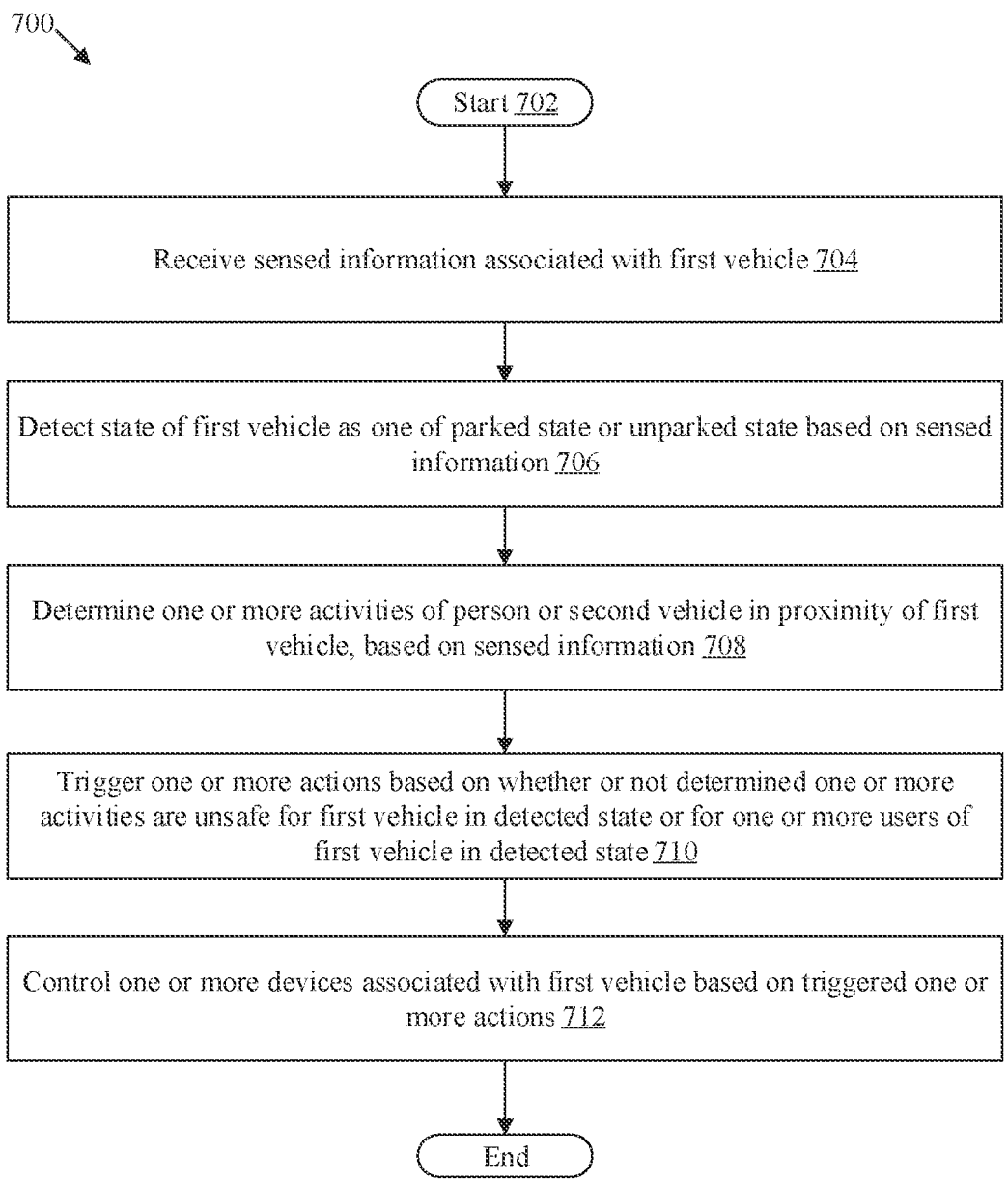
FIG. 7 is a flowchart that illustrates an exemplary method of vehicle control for user safety and experience, in accordance with an embodiment of the disclosure.

FIG. 7 is a flowchart that illustrates an exemplary method of vehicle control for user safety and experience, in accordance with an embodiment of the disclosure. FIG. 7 is explained in conjunction with elements from FIGS. 1, 2, 3A, 3B, 4A, 4B, 4C, 5A, 5B, 5C, and 6. With reference to FIG. 7, there is shown a flowchart 700. The operations of the flowchart 700 may be executed by any computing system, such as the system 102 or the circuitry 202. The operations may start at 702 and proceed to 704.

At 704, sensed information may be received. In one or more embodiments, the circuitry 202 may be configured to receive sensed information associated with a first vehicle, as described, for example, in FIGS. 3A and 3B.

At 706, a state of the first vehicle (such as the first vehicle 104) may be detected. In one or more embodiments, the circuitry 202 may be configured to detect the state of the first vehicle 104 as one of a parked state or an unparked state based on the sensed information, as described, for example, in FIGS. 3A and 3B.

At 708, one or more activities may be determined. In one or more embodiments, the circuitry 202 may be configured to determine the one or more activities of a person (such as the person 106) or a second vehicle (such as the second vehicle 108) in proximity of the first vehicle 104, based on the sensed information, as described, for example, in FIGS. 3A and 3B.

At 710, one or more actions may be triggered. In one or more embodiments, the circuitry 202 may be configured to trigger the one or more actions based on whether or not the determined one or more activities are unsafe for the first vehicle 104 in the detected state or for one or more users (such as the user 118) of the first vehicle 104 in the detected state, as described, for example, in FIGS. 3A and 3B.

At 712, one or more devices (such as the one or more devices 110) may be controlled. In one or more embodiments, the circuitry 202 may be configured to control the one or more devices 110 associated with the first vehicle 104 based on the triggered one or more actions. The one or more devices 110 may include a light-based projector device (such as the light-based projector device 110A) that is controlled to project a visual alert, included in the triggered one or more actions, directly onto a physical surface, and the physical surface is a window portion 120 of the first vehicle 104 or a physical structure which is external to and separate from the first vehicle 104. Details of the control of one or more devices is described, for example, in FIGS. 3A and 3B. Control may pass to end.

Although the flowchart 700 is illustrated as discrete operations, such as 702, 704, 706, 708, 710, and 712, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions executable by a machine and/or a computer (for example, the system 102). The computer-executable instructions may cause the machine and/or computer (for example, the system 102) to perform operations and may further include retrieval of sensed information associated with a first vehicle 104. The operations may include detection of a state of the first vehicle 104 as one of a parked state or an unparked state based on the sensed information. The operations may include determination of one or more activities of a person 106 or a second vehicle 108 in proximity of the first vehicle 104, based on the sensed information. The operations may include triggering of one or more actions based on whether or not the determined one or more activities are unsafe for the first vehicle 104 in the detected state or for one or more users (such as the user 118) of the first vehicle 104 in the detected state. The operations may include control of one or more devices 110 associated with the first vehicle 104 based on the triggered one or more actions. The one or more devices 110 include a light-based projector device 110A that is controlled to project a visual alert, included in the triggered one or more actions, directly onto a physical surface, and the physical surface is a window portion 120 of the first vehicle or a physical structure which is external to and separate from the first vehicle.

Exemplary aspects of the disclosure may include a system (such as the system 102) that may include circuitry (such as the circuitry 202). The circuitry 202 may be configured to receive sensed information associated with a first vehicle 104. The circuitry 202 may be configured to detect a state of the first vehicle 104 as one of a parked state or an unparked state based on the sensed information. The circuitry 202 may be configured to determine one or more activities of a person 106 or a second vehicle 108 in proximity of the first vehicle 104, based on the sensed information. The circuitry 202 may be configured to trigger one or more actions based on whether or not the determined one or more activities are unsafe for the first vehicle 104 in the detected state or for one or more users of the first vehicle 104 in the detected state. The circuitry 202 may be configured to control the one or more devices 110 associated with the first vehicle 104 based on the triggered one or more actions. The one or more devices 110 include a light-based projector device 110A that is controlled to project a visual alert, included in the triggered one or more actions, directly onto a physical surface, and the physical surface is a window portion 120 of the first vehicle 104 or a physical structure which is external to and separate from the first vehicle.

In accordance with an embodiment, the determined one or more activities may indicate that the person 408 suspiciously hides behind or stands in proximity of the first vehicle 402, while the first vehicle 402 is detected to be in the parked state.

In accordance with an embodiment, the projected visual alert includes a first sign which cautions or alerts the one or more users (such as user 410) in the proximity of the first vehicle 402, and direction information which informs the one or more users 410 about a direction in which the person 408 is present.

In accordance with an embodiment, the circuitry 202 may be further configured to determine an indication of whether or not an area within a threshold distance from the first vehicle 402 is safe, while the detected state of the first vehicle 402 is the parked state. The indication may be determined based on the sensed information, the determined one or more activities, and information related to unsafe activities in locations proximal to the first vehicle 402, and the one or more actions are triggered further based on the determined indication.

In accordance with an embodiment, the projected visual alert may include a second sign which informs the one or more users 410 in the proximity of the first vehicle 402 about a level of safety associated with the area around the first vehicle 402.

In accordance with an embodiment, the circuitry 202 may be further configured to control a user device 412 to display the visual alert comprising first information which cautions the one or more users 410 in proximity of the first vehicle 402. The user device 412 may be further controlled to display a user interface (UI) element 414 as a panic button. Based on a user selection of the panic button, the user device 412 may transmit a message that includes a distress call to one or more mobile devices and may signal the one or more devices associated with the first vehicle to activate.

In accordance with an embodiment, the determined one or more activities may include an unsolicited interaction of the person 408, who is unassociated with the one or more users, with the first vehicle 402.

In accordance with an embodiment, the circuitry 202 may be further configured to determine a damage to the first vehicle 402 based on the determined one or more activities, while the detected state of the first vehicle 402 is the parked state. The one or more actions may be further triggered based on the determined damage.

In accordance with an embodiment, the projected visual alert may include a third sign which informs the one or more users 410 in proximity of the first vehicle about the damage to the first vehicle 402.

In accordance with an embodiment, the determined one or more activities may include an activity in which the second vehicle 506 tailgates the first vehicle 502 while the first vehicle 502 is detected to be in the moving state.

In accordance with an embodiment, the circuitry 202 may be further configured to determine a first set of projection parameters based on the sensed information and the determined one or more activities. The visual alert may include a warning to deter the second vehicle 506 from tailgating the first vehicle 502 and may be projected further based on the determined first set of projection parameters.

In accordance with an embodiment, the triggered one or more actions may further include one or more signals to activate a second device of the one or more devices. The second device may be one of an interior lighting system, an exterior lighting system, an automotive audio-video system, or a door locking system.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A system, comprising:
   circuitry configured to:
   receive sensed information associated with a first vehicle;
   detect a state of the first vehicle as one of a parked state or an unparked state based on the sensed information;
   determine one or more activities of a person or a second vehicle in proximity of the first vehicle, based on the sensed information,
      wherein the determined one or more activities indicate that the person suspiciously one of hides behind or stands in proximity of the first vehicle in the parked state;
   trigger one or more actions based on the determined one or more activities that are unsafe for the first vehicle in the detected state or for one or more users of the first vehicle in the detected state; and
   control one or more devices associated with the first vehicle based on the triggered one or more actions, wherein
      the one or more devices comprise a light-based projector device that is controlled to project a visual alert, included in the triggered one or more actions, directly onto a physical surface,
      the projected visual alert includes a first sign that includes:
         one of a graphic symbol or a danger sign which cautions the one or more users of the first vehicle about the person who suspiciously one of hides behind or stands in the proximity of the first vehicle, and
         direction information which informs the one or more users of the first vehicle about a direction in which the person is present, and
      the physical surface is one of a window portion of the first vehicle or a physical structure which is external to and separate from the first vehicle.

2. The system according to claim 1, wherein the circuitry is further configured to:
   determine an indication of whether an area within a threshold distance from the first vehicle is safe based on the detected state of the first vehicle as the parked state, wherein the indication is determined based on the sensed information, the determined one or more activities, and information related to unsafe activities in locations proximal to the first vehicle; and
   trigger the one or more actions based on the determined indication.

3. The system according to claim 2, wherein the projected visual alert further includes a second sign which informs the one or more users in the proximity of the first vehicle about a level of safety associated with the area around the first vehicle.

4. The system according to claim 1, wherein the circuitry is further configured to control a user device to:
   display the visual alert that further includes first information which cautions the one or more users in the proximity of the first vehicle; and
   display a user interface (UI) element as a panic button, wherein based on a user selection of the panic button, the user device:
      transmits a message that includes a distress call to one or more mobile devices; and
      signals the one or more devices associated with the first vehicle to activate.

5. The system according to claim 1, wherein the determined one or more activities include an unsolicited interaction of the person, who is unassociated with the one or more users, with the first vehicle.

6. The system according to claim 5, wherein the circuitry is further configured to:
   determine a damage to the first vehicle, based on the determined one or more activities and the detected state of the first vehicle as the parked state; and
   trigger the one or more actions based on the determined damage.

7. The system according to claim 6, wherein the projected visual alert further includes a third sign which informs the one or more users in the proximity of the first vehicle about the damage to the first vehicle.

8. The system according to claim 1, wherein the determined one or more activities include an activity in which the second vehicle tailgates the first vehicle, and the first vehicle is in the unparked state.

9. The system according to claim 8, wherein
the circuitry is further configured to determine a first set of projection parameters based on the sensed information and the determined one or more activities,
the projected visual alert further includes a warning to deter the second vehicle from tailgating the first vehicle, and
the visual alert is projected based on the determined first set of projection parameters.

10. The system according to claim 1, wherein
the triggered one or more actions further include one or more signals to activate a second device of the one or more devices, and
the second device is one of an interior lighting system, an exterior lighting system, an automotive audio-video system, or a door locking system.

11. A method, comprising:
receiving sensed information associated with a first vehicle;
detecting a state of the first vehicle as one of a parked state or unparked state based on the sensed information;
determining one or more activities of a person or a second vehicle in proximity of the first vehicle, based on the sensed information,
wherein the determined one or more activities indicate that the person suspiciously one of hides behind or stands in proximity of the first vehicle in the parked state;
triggering one or more actions based on the determined one or more activities that are unsafe for the first vehicle in the detected state or for one or more users of the first vehicle in the detected state; and
controlling one or more devices associated with the first vehicle based on the triggered one or more actions, wherein
the one or more devices comprise a light-based projector device that is controlled to project a visual alert, included in the triggered one or more actions, directly onto a physical surface,
the projected visual alert includes a first sign that includes:
one of a graphic symbol or a danger sign which cautions the one or more users of the first vehicle about the person who suspiciously one of hides behind or stands in the proximity of the first vehicle, and
direction information which informs the one or more users of the first vehicle about a direction in which the person is present, and
the physical surface is one of a window portion of the first vehicle or a physical structure which is external to and separate from the first vehicle.

12. The method according to claim 11, further comprising:
determining an indication of an area within a threshold distance from the first vehicle is safe, based on the detected state of the first vehicle as the parked state,
wherein the indication is determined based on the sensed information, the determined one or more activities, and information related to unsafe activities in locations proximal to the first vehicle; and
triggering the one or more actions based on the determined indication.

13. The method according to claim 12, wherein the projected visual alert further includes a second sign which informs the one or more users in the proximity of the first vehicle about a level of safety associated with the area around the first vehicle.

14. The method according to claim 11, further comprising controlling a user device to:
display the visual alert that further includes first information which cautions the one or more users in the proximity of the first vehicle; and
display a user interface (UI) element as a panic button, wherein based on a user selection of the panic button, the user device:
transmits a message that includes a distress call to one or more mobile devices; and
signals the one or more devices associated with the first vehicle to activate.

15. The method according to claim 11, wherein the determined one or more activities include an unsolicited interaction of the person, who is unassociated with the one or more users, with the first vehicle.

16. A non-transitory computer-readable medium having stored thereon, computer-executable instructions that when executed by a system, causes the system to execute operations, the operations comprising:
receiving sensed information associated with a first vehicle;
detecting a state of the first vehicle as one of a parked state or unparked state based on the sensed information;
determining one or more activities of a person or a second vehicle in proximity of the first vehicle, based on the sensed information,
wherein the determined one or more activities indicate that the person suspiciously one of hides behind or stands in proximity of the first vehicle in the parked state;
triggering one or more actions based on the determined one or more activities that are unsafe for the first vehicle in the detected state or for one or more users of the first vehicle in the detected state; and
controlling one or more devices associated with the first vehicle based on the triggered one or more actions, wherein
the one or more devices comprise a light-based projector device that is controlled to project a visual alert, included in the triggered one or more actions, directly onto a physical surface,
the projected visual alert includes a first sign that includes:
one of a graphic symbol or a danger sign which cautions the one or more users of the first vehicle about the person who suspiciously one of hides behind or stands in the proximity of the first vehicle, and
direction information which informs the one or more users of the first vehicle about a direction in which the person is present, and
the physical surface is one of a window portion of the first vehicle or a physical structure which is external to and separate from the first vehicle.

* * * * *